July 12, 1955 K. A. KNUTSEN 2,712,898

ARRANGEMENT FOR ANALYSIS AND COMPARISON OF RECORDINGS

Filed July 16, 1951 3 Sheets-Sheet 1

INVENTOR
KNUT ANDREAS KNUTSEN
By:
Hazeltine, Lake & Co.
AGENTS

INVENTOR
KNUT ANDREAS KNUTSEN
By:
Haseltine, Lake & Co.
AGENTS

ARRANGEMENT FOR ANALYSIS AND COMPARISON OF RECORDINGS

Filed July 16, 1951

Inventor
Knut Andreas Knutsen
By: Haseltine, Lake & Co.
Agents

United States Patent Office 2,712,898

Patented July 12, 1955

2,712,898

ARRANGEMENT FOR ANALYSIS AND COMPARISON OF RECORDINGS

Knut Andreas Knutsen, Paris, France, assignor to Compagnie des Machines Bull (Societe Anonyme), Paris, France Application July 16, 1951, Serial No. 237,041

Claims priority, application France July 19, 1950

9 Claims. (Cl. 235—61.7)

The present invention relates to arrangements for the analysis of recordings and the comparison of data capable of effecting the control of operating parts in accounting or statistical machines controlled by recording strips or cards.

The comparison and arrangement hereafter described makes it possible to obtain, for each comparison of two data, a result indicating that one of the data is greater than, equal to, or smaller than the other. Such a result is sufficient for enabling the invention to be used for various accounting and statistical operations. In particular the invention lends itself to being employed when it is a question of undertaking a classifying or selecting operation.

Various accounting or statistical machines are known which employ mechanical or electrical analysis or comparison arrangements for obtaining the said result.

The arrangement according to the present invention is adapted to replace these known comparison arrangements and has, in the first place, the advantage of permitting an increase in the speed of operation of the machine. Another advantage resulting from the present invention is the elimination of the intermediate storage arrangement for data which is necessary in many cases when the data carriers are analysed while moving, as is generally the case with perforated card machines with electrical analysis.

The practical application of the invention is provided on a machine comprising one or more analysis arrangements consisting essentially of a cathode ray tube of the "iconoscope" or like type provided with a mosaic plate on which is projected the optical image of a recording card at rest and completed by scanning devices for bringing the cathode ray first of all on to the first column to be explored, in order to explore the said column in a definite order of the values of the recording positions and then to repeat the same exploration on the following columns in increasing or decreasing decimal order with a view to producing a train of impulses which are regulated in time and which represent the values of the markings analysed.

This analysis arrangement is adapted to analyse cards or strips carrying data recorded in the form of markings according to the code of one marking per column or according to the binary code.

The said analysis arrangement has the advantage that a pre-determined zone of variable position may be selected for the exploration as a result of an initial regulation of the voltages or currents acting on the deflection of the cathode beam in a direction perpendicular to that of the columns projected on to the mosaic plate of the analyser tube.

An object of the present invention is a machine using recording bands or cards provided with one or more cathode tube reading devices for the simultaneous comparison of certain data of two recording cards, two recording bands or of two zones of a single card or band.

Another object of the present invention is a machine equipped with one or more cathode ray tube reading devices combined with one or more comparison arrangements for reading off and comparing data recorded on one or several data carriers, this machine being provided with means for actuating, according to the result of the comparison, one or more control members and to control the functioning of the machine in accordance with the said result, this functioning being adapted to include the recording of the data read by the said reading device or devices on the same carrier or carriers or on other data carriers, the carrying out of calculations followed by the recording of the result, the classifying, the selection or any other operation which is generally done by accounting or statistical machines controlled by recording cards or bands.

Another object of the invention is a machine comprising one or more cathode ray reading arrangements combined with electronic tube comparison means for comparing at will certain data read on a data carrier with other data read on the same data carrier or on one or several other data carriers, the result of this comparison indicating that a datum is greater than, smaller than or equal to another being expressed by the condition of functioning of electronic tubes allocated for this purpose, these tubes controlling the operation of the machine.

Another object of the invention is an analysis and comparison arrangement for comparing the data of a card referred to as the "primary" with those of a card referred to as the "secondary," composed of two series of analysis and comparison members, each series comprising an iconoscope tube and electronic valve circuits, one part of which, acting in co-operation with the corresponding members of the other series, functions as a discriminator of non-simultaneous impulses and the other part of which, comprising an electronic arrangement having two stable equilibrium states co-operating with the circuits of the other series, responds either to the first or to the last non-simultaneous impulse received in order to indicate the relative value of the data which have been analysed.

Another object of the invention is an arrangement for the comparison of two impulse trains, of which the first impulses correspond to the numerical values and to the lowest decimal order and of which the last impulses correspond to the numerical values and to the highest decimal order, this arrangement comprising two series of electronic circuits each allocated to receive one of the said impulse trains, each series being composed of an inverting amplifier stage, a circuit-breaking or gating stage and a comparison stage proper, the comparator group thus formed being adapted to show a certain condition of inequality with respect to the non-simultaneous impulse last received.

Another object of the invention is a comparison arrangement in which each circuit-breaking stage is constituted of an electronic valve with at least two grids controlling the anode output and in which the coupling of the amplifying inverting stages and the circuit-breaking stages of the two series is such that at the time of the reception of two simultaneous impulses, there is in the valve of each circuit-breaking stage, compensation between the opening action caused by one grid and the closing action caused by the other grid, with the result in this case that no impulse is transmitted to the comparison stages which may, for example, be electronic triggers.

Another object of the invention is a comparison arrangement in which the triggers of the two series of circuits are coupled in such manner that when one trigger has been triggered by a first impulse which has caused it to leave the rest position, it is then brought back to the said rest position by the other trigger when the latter has itself been triggered by an impulse subsequent to the first impulse.

Another object of the invention is a comparison arrangement combined with a control arrangement of operative electro-magnets comprising a multi-grid valve associated with each trigger of the comparison group and in which an impulse to the screen grids of the two valves produces an increase in the anode current of the valve of which the associated trigger is at this moment in a triggered position different from the rest position.

Another object of the invention is an arrangement for the comparison of two impulse trains of which the first impulses correspond to the highest numerical values and denominational order and of which the last impulses correspond to the lowest numerical values and denominational order, this arrangement comprising two series of electronic circuits each arranged to receive one of the said impulse trains, each series being composed of circuits adapted so that two impulses received simultaneously on the two series are cancelled out, a circuit-breaking stage and a trigger provided with connections with the members of the other series of such a nature that only the first non-simultaneous impulse is capable of modifying the condition of stability of the trigger corresponding to the highest value in the decimal order where an inequality is shown.

Other objects and features of the invention will be apparent from the following description and from reference to the accompanying drawings which show, by way of example, one particular embodiment of the invention.

The embodiment which is about to be described is provided for ensuring the control of a recording card machine of the type known as a "collating machine." It may be applied to a machine of the type disclosed in United States application No. 716,796 of the December 17, 1946, now Patent No. 2,610,736.

An important modification to be incorporated in this machine will consist in modifying the feed members for the cards in such manner that a given card is stopped at a suitable position during the analysis phase of one machine cycle. It will consequently be seen that during this analysis phase, the card in question must be stopped always in the same position in the field of a fixed objective.

Figure 1:
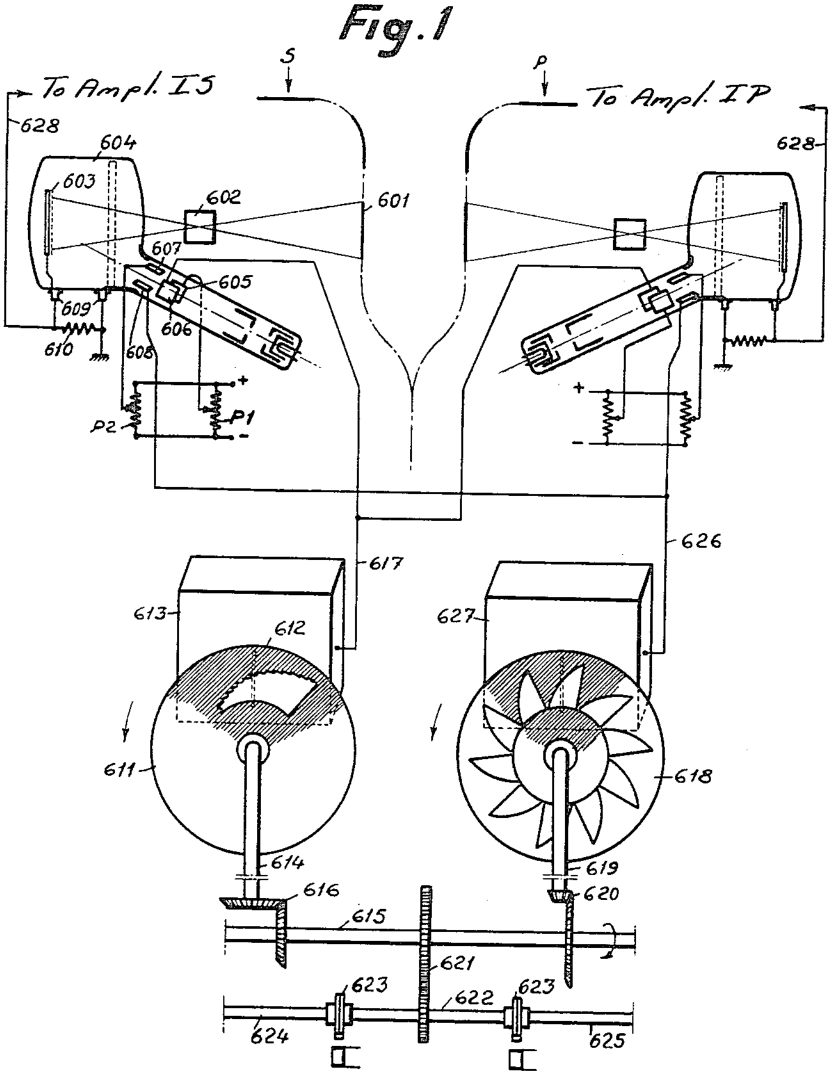
Figure 1 is a diagrammatic view of arrangements for analysing a pair of recording cards.

Figure 1 shows the arrangements for analysing the cards in the analysis position on the primary and secondary tracks, for example. As the analysis members are alike for both tracks, the description may be applied to either of them. Considering the card 601 of the secondary track, it will be seen that its image is projected by an objective 602 on to the mosaic plate 603 of a cathode ray tube 604 of the iconoscope type. This tube comprises a pair of deflecting plates 605 and 606 for horizontal deviation and a pair of deflecting plates 607 and 608 for vertical deviation. Two output terminals 609 enable the impulses resulting from the scanning of the mosaic plate by the cathode beam to be collected on the load resistor 610. The iconoscope tube obviously includes all the members suitable for the production and the control of the cathode beam but it is pointless to show them specifically on the figure. The deflecting plate 605 is connected to the movable contact of a potentiometer P1 connected to the + and — terminals of a suitable voltage source in order to be able to adjust the horizontal deviation of the beam when at rest position. The deflecting plate 607 is similarly connected to the movable contact of the potentiometer P2 connected to the + and — terminals of the same voltage source in order to be able to adjust the vertical deviation of the beam when at rest position. The production of scanning voltages is based on the combination means, photo-electrical means and electronic means of the same type as those described in United States application Serial No. 93,860 of May 17, 1949, now Patent No. 2,579,800.

Figure 4:
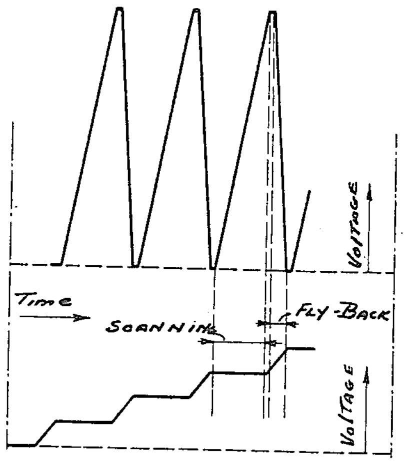
Figure 4 is a time graph of the scanning voltages applied to the analyser tubes.

A scanning arrangement consists essentially of a rotating disc and an amplifier. For the horizontal scanning or change of column, there is provided (bottom left-hand corner of Figure 1), a rotating disc 611 located between a light source (not shown) and a slot 612 formed in the casing of the amplifier 613 which contains a photoelectric cell arranged in such a manner as to receive the luminous beam controlled by the said slot. The rotating disc, fixed on the shaft 614 receives its movement from the main shaft 615 through a set of pinions 616. The disc 611 is almost completely opaque except for a transparent zone, the stepped external shape of which is arranged in such manner that the amplifier delivers, as a result of the light variations, a continuous voltage which varies in stages as indicated by the bottom part of Figure 4.

The plates 606 of the iconoscopes (Figure 1) are connected by connections such as 617 to the output of this amplifier.

The vertical scanning arrangement is similar to the foregoing except as concerns the rotating disc 618 fixed on the shaft 619 driven by the main shaft through the set of pinions 620. This disc is generally opaque except for 10 transparent segments. Taking into account the direction of rotation, each segment has a predetermined curved portion for producing a linear increase of the light admitted to the opposing slot so that the amplifier delivers a saw tooth voltage as indicated in the upper part of Figure 4.

In each transparent segment, the straight line which follows the curved portion corresponds to the return path of the cathode beam and to the descending portion of the saw tooth.

It will be seen (Figure 1) that the main shaft also drives an intermediate shaft 622 by means of the set of pinions 621. The intermediate shaft 622, by means of single revolution electromagnetic clutches 623, may drive either simultaneously or separately the secondary feed shaft 624 and the primary feed shaft 625.

One machine cycle is here divided into 24 points. During the points 1 to 12, the feeding has taken place either of one card or of two cards at the same time. The points 13 to 18 inclusive are reserved for the exploration and comparison . Finally points 19 to 24 inclusive are used for materialising the results of the comparison and for preparing the control of the following cycle.

The disc 611 makes one revolution per machine cycle and its transparent zone covers a quarter of a revolution or six points. As it is proposed to explore and compare cards over an extent of 20 columns at a maximum, the transparent zone comprises 20 steps of the same angular extent.

In order to correspond to the exploration of 20 columns, the disc 618 must make two revolutions during this time, that is to say, its speed must be 8 times greater than that of the disc 611. The relative timing of the two rotating discs must be such that the synchronisation of the scanning voltages is ensured in accordance with Figure 4. The plates 608 (Figure 1) of the iconoscopes are connected by connections such as 626 to the output of the amplifier 627.

Having regard to the conversion possibilities of electronic amplifiers, it will be understood that it will be possible on the one hand to reverse the opaque zones and the transparent zones on each disc or, on the other hand, to provide for the use of iconoscope tubes having magnetic deviation which would make it necessary, for the scanning operations, to have variations in current intensity instead of variations in voltage, but which would not present any other difficulty. It would also be possible to provide purely electronic scanning arrangements provided that they were suitably synchronised.

When the image of a card with the datum markings is correctly projected on the mosaic plate of an iconoscope, the successive scanning of the columns of the projected image is translated at the output terminals into a train of impulses regulated in time. If it is a question of cards having one marking per column, the said marking is translated by an impulse regulated in the unit scanning time of one column in order to represent the numerical value of the said marking. The interval of time between the commencement of each scanning and the impulse characteristic of the marking is called the effective scanning period. As the polarity of the collected impulses is of little importance, the markings may have a luminosity smaller or greater than that of the card.

Figure 5:
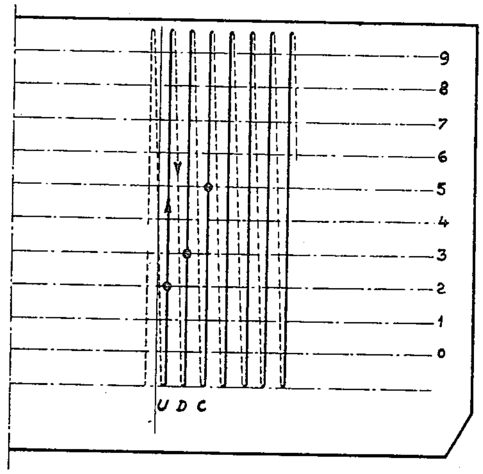
Figure 5 shows a procedure for exploring a zone of the image of a recording card of known type.

Figure 5 shows how it is possible to carry out the exploration of the card image. One advantage of the present invention resides in the fact that the cathode beam may be caused to scan any zone of the card over a fixed number of columns, as a consequence of the initial setting of the potentiometer P1 (Figure 1). It is sufficient for the beam to be adjusted while at rest on a column adjacent to the zone to be explored.

For the exploration, the beam is displaced horizontally in succession on the columns of the zone, commencing with the lowest decimal column or the unit column. For each column the beam must start below the smallest numerical value, for example zero, and be displaced until above the highest value, for example 9 in order then to be brought rapidly on to the adjacent column below the smallest numerical value, and so on. During the time that the cathode beam is returning, that is to say, between each effective exploration of the column, the beam must be cut off by suitable polarisation of the Wehnelt grid. Similarly, the beam must also be cut off during the points 1 to 12 and 19 to 24 of the cycle. For this purpose, the means employed in television may be provided and since it is assumed that they are known, they have not been illustrated so as to simplify the drawings.

The impulses resulting from the reading of the recording cards are applied to discriminator and comparator circuits which are about to be described with reference to Figure 2. These circuits comprise two chains, one of which receives the primary impulses P and the other the secondary impulses S.

The two chains are identical and respectively comprise an amplifier stage IP or IS, an inverter amplifier stage AIP or AIS, a circuit breaking stage GP or GS, a trigger stage BP or BS and a control stage VP or VS.

The amplifier IP receives the impulses supplied by the iconoscope 604P by means of conductor 628P (Figures 1 and 2), while the amplifier IS receives the impulses supplied by the iconoscope 604S by means of the conductor 628S.

Each amplifier IP or IS (Figure 2) may supply at the output 630 and for each impulse received at the input 629, an impulse of sufficient voltage and selected polarity, in this case negative.

Now considering only the chain S, a conductor 631 connects the output 630 of IS to the input terminal 632 of the stage AIS. The latter comprises essentially a vacuum tube 633 comprising at least one cathode, a control grid and an anode. The cathode of this tube is connected to the earth 0. A load resistor 634 is connected between a high-tension source and the anode, the junction of the resistor 634 and the anode constituting the output terminal 635. At rest, the grid has the potential of a bias source Pol. 1 because of its connection with the resistor 636. A condenser 637 transmits the impulse received at the input 632 to the grid.

The circuit-breaking stage GS comprises essentially a vacuum tube 638 the anode current of which depends upon the voltages of at least two grids operating separately or simultaneously. In the case in question, a pentode with a small cut-off grid voltage is employed. The cathode of this tube as well as the suppressor grid are brought to a positive voltage of about 30 volts with respect to earth. A load resistor 639 is connected between a high-tension source and the anode, the junction point of the resistor 639 and the anode constituting the output terminal 640. At rest, the control grid is at the voltage of a bias source Pol. 2 because of its connection with the resistor 641. Impulses may be received at 642 and transmitted to the control grid by a condenser 643. The screen grid, through the terminal 644 and the conductor 645 connected to the output terminal 635 of the AIS stage is brought to the same voltage as the anode of the valve of this stage.

Crossed connections 646S and 646P exist respectively between the output terminal 630 of IS and the input terminal 642 of GP and between the output terminal 630 of IP and the input terminal 642 of GS.

It is necessary to arrange that the load resistor 634 and the value of Pol. 1 are such that, in the rest position, the anode of the valve 633 has a positive voltage of about 30 volts and that the anode output is clearly greater than the output of the screen grid of the valve 638 when the latter is under the conditions which will be defined hereafter. At rest, the voltage of the control grid of the valve 638 is slightly negative with respect to the cathode and would permit a considerable anode output if the screen grid at this moment only had a substantially zero voltage with respect to the cathode, as can be verified in accordance with the foregoing explanations.

If necessary, the circuits of the control grids of the valves 633 and 638 could be made to return directly to their respective cathodes, the bias voltage then being obtained by the grid currents in the leakage resistor 636 and 641.

The assembly of the stages AIS and AIP, GS and GP forms a discriminator arrangement, the operation of which is as follows.

Assuming that a negative impulse produced only at the output 630 of IS is transmitted to the grid of the valve 633 of AIS then if this impulse is not deformed by the circuit 636–637 and if its amplitude is of the order of the cut-off grid voltage of the valve, an amplified positive impulse of a duration substantially equal to the input impulse will appear between the earth and the output terminal 635.

This positive impulse results from the suppression of the anode current of the valve 633 and its object is to bring the screen grid of the valve 638 of the stage GS to a sufficiently high voltage to cause an appreciable increase in the anode output of the said tube 638, the control grid being only slightly negative with respect to the cathode. It is necessary that the current supplied at this moment by the screen grid of the valve 638 be only a part of the anode output of the valve 633 at rest: otherwise no impulse would be transmitted to the said screen grid.

When the anode current of the valve 638 rises, the voltage drop through the load resistor 639 is also increased, which is translated by a negative impulse available between earth and the output terminal 640 of the stage GS.

It is to be noted that the negative impulse which initially appears at the output 630 of IS is also transmitted by the conductor 646 to the input 642 of GP, but remains without any effect on the latter since the screen grid of the valve 638 of GP is practically at a zero voltage with respect to its cathode.

In the case of reading two markings of equal value, there are produced two simultaneous impulses which are available at the terminals 630 of IS and IP. The arrangement is such that in this case no impulse may appear at the output terminals 640 of the circuit-breaking stages GS and GP.

Actually, in view of the foregoing, it is clear that the said two impulses compel the production of two positive impulses applied to the screen grids of the valves 638 of GS and GP, which would normally modify the anode outputs of these tubes. As the negative impulses available at the same moment at the terminals 630 of IS and IP are transmitted by the crossed connections 646S and 646P to the inputs 642 and thus to the control grids of the valves 638 of GS and GP, the increase in potential of the screen grids is compensated for by the simultaneous increase in the negative bias of the control grids and the anode outputs must remain at the value which they have at rest.

In order to obtain this result, it is sufficient suitably to determine the gain of the stages AIS and AIP, account being taken of the amplitude of the impulses collected at the output of IS and IP. Each circuit chain S and P is followed by an electronic trigger BS and BP, the assembly of which constitutes the comparator arrangement proper.

Figure 3:
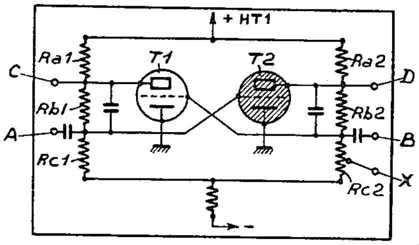
Figure 3 is a theoretical diagram of an electronic trigger of known type.

Although well known, it is necessary to refer briefly to the composition and the operation of an electronic trigger. Figure 3 supplies a sufficiently clear explanation of the arrangement of a typical trigger. It is known that such a circuit has two states of stable equilibrium: one in which the valve T1 is conducting and the valve T2 is out of service, and the other conversely in which T1 is out of service and T2 is conducting. For convenience, the first state may be called "1" and the second state "0." The valve T2 is shown cross-hatched in Figure 3 to indicate that it is conducting and in order to show in a conventional manner the circuit at the state "0."

Each input terminal A and B constitutes an asymmetrical input. According to the previous condition of stability of the trigger and according to the input to which it is applied, a triggering impulse must be of positive or negative polarity in order to modify the said previous condition of stability.

Thus in order to obtain the triggering when the trigger is at the "0" condition it is necessary to apply a negative impulse at A or a positive impulse at B, because impulses of inverse polarity sent respectively to the same inputs would have no effect. When the trigger is in the "1" condition, it is necessary to apply a positive impulse at A or a negative impulse at B in order to change it to the "0" position.

At the moment of triggering, it is possible to obtain impulses at the terminals C and D. When the trigger passes from the "0" to the "1" condition, a negative impulse is available at C and a positive impulse at D. When the trigger passes from the "1" to the "0" condition, a positive impulse is available at C and the negative impulse at D.

Finally, it is known that it is possible to control the operation of other electronic devices as a function of the conditions of stability of a trigger by taking off one of the resistance chains, voltages which are different according to the condition of the trigger, for example, at an intermediate point such as X (Figure 3) of the chain $Ra2$, $Rb2$, $Rc2$.

Figure 2:
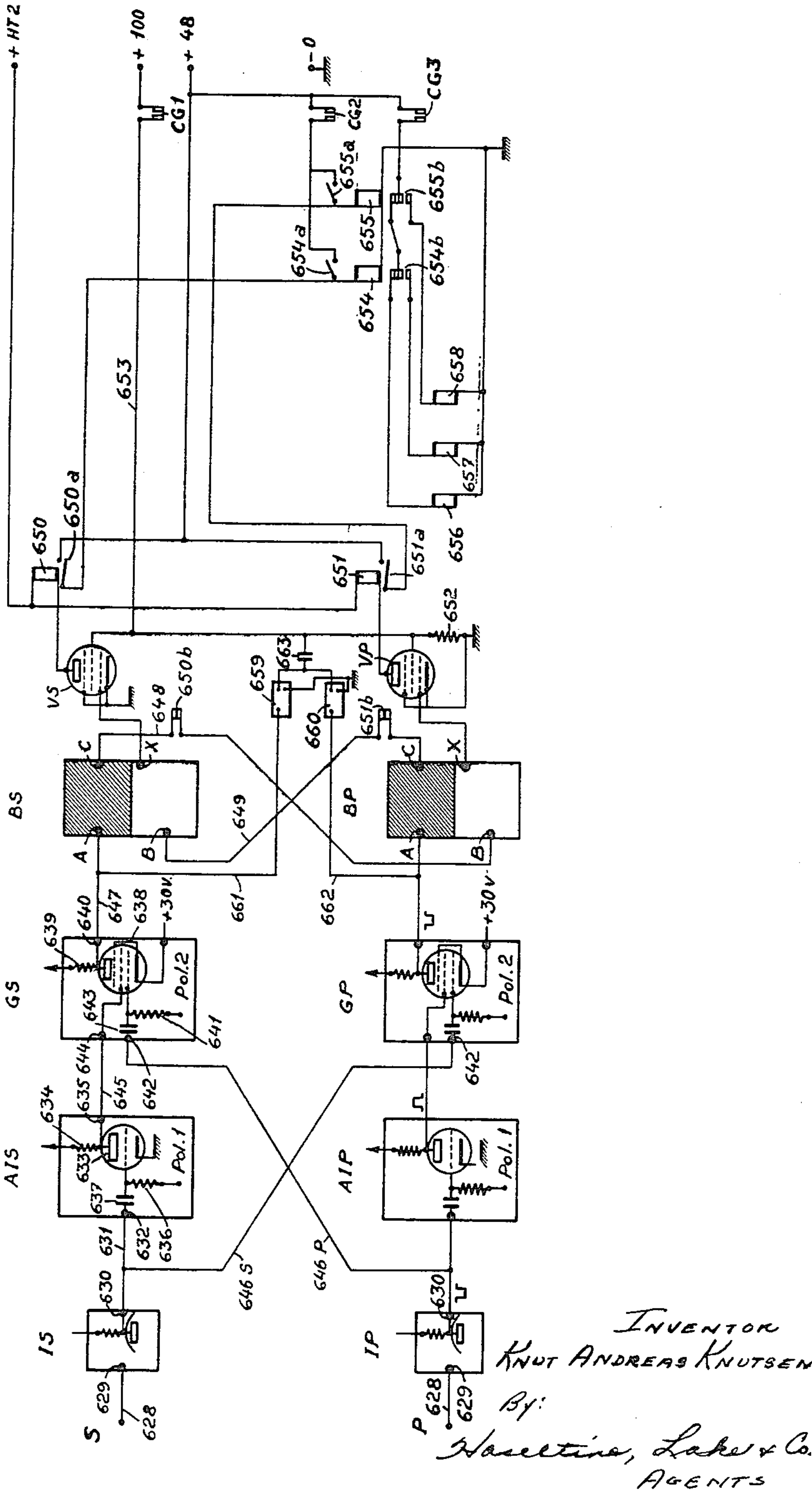
Figure 2 is a theoretical diagram of the comparison and control circuits.

Figure 2 shows that the input A of the trigger BS is connected by a conductor 647 to the output 640 of GS and the input A of the trigger BP is connected by a conductor 647 to the output 640 of GP.

The output C of the trigger BS is connected by a conductor 648 to the input B of the trigger BP while the output C of the trigger BP is connected by a conductor 649 to the input B of the trigger BS. The purpose of the relay contacts 650*b* and 651*b*, which are normally closed, will be indicated later.

The comparison of the values of the markings recorded on a pair of cards S and P is effected by means of the circuits and arrangements just described in the following manner.

Before each analysis of a pair of cards S and P, the triggers BS and BP are brought to the "0" condition by means which will be later described.

It has previously been explained that if two markings are analysed simultaneously, there will be produced no impulse at the outputs 640 of GS and GB.

Consequently, in this case, the two triggers BS and BP remain in the "0" condition, which condition may indicate either the absence of markings or the equality of the markings simultaneously analysed on a pair of cards S and P.

Assuming that an analysed column of one card S bears a marking of the value 3, while a column analysed at the same time on the card P bears a marking with the value 5, a negative impulse is first of all transmitted to the input A of the trigger BS and causes it to change from the "0" condition to the "1" condition. It is to be noted that the negative impulse thus available at C of BS has no effect on BP. When the negative impulse corresponding to the marking 5 arrives at the input A of BP, the latter passes from the "0" condition to the "1" condition. The negative impulse resulting therefrom at the terminal C of BP is transmitted by 649 to the input B of BS, and since the latter is at this moment in the "1" condition, it causes it to trigger and return to the "0" condition. The result of the triggering of BS is a positive impulse at C which, although transmitted by 648 to the input B of BP, remains without any effect on the latter. The result obtained is thus that of two non-simultaneous impulses applied respectively to the triggers BS and BP, it is the latter, that is to say, the one representing the highest value of the two, which determines the final condition of the comparator assembly. In other words, after the analysis of two corresponding columns S and P, in the case where S is greater than P, the trigger BS is in the "1" condition and the trigger BP in the "0" condition, and when P is greater than S, the trigger BP is in the "1" condition and the trigger BS in the "0" condition.

This, taken in conjunction with the above described discrimination of impulses, supplies three possible conditions for the comparator assembly corresponding respectively to $S=P$, $S>P$, $P>S$.

These results apply for a succession of columns under the condition already mentioned that the successive analysis is carried out in the increasing order of the decimal orders. The table below shows the comparison of a value $S=643$ with a value $P=445$.

| Succession of impulses | | State of triggers | |
|---|---|---|---|
| S | P | BS | BP |
| 3 | ------ | 1 | 0 |
| ------ | 5 | 0 | 1 |
| 4 | 4 | 0 | 1 |
| ------ | 4 | 0 | 1 |
| 6 | ------ | 1 | 0 |

The analysis and comparison arrangements which have been described can also be used without modification when the values are recorded in columns in binary order, that is to say, in accordance with the progression 1, 2, 4, 8, 16 etc., one condition being that the exploration of each column is carried out by commencing at the smallest binary position or 1.

The present arrangement of comparison may be used as control means in calculating or tabulating machines controlled by recordings.

The arrangements hereinafter described relate to the application of the invention to a card collating machine of the type described in the aforementioned patent.

VS and VP (Figure 2) are pentode valves respectively having in their anode circuit a relay magnet 650 and 651, the circuit extending up to a common high-tension source +HT2. The cathodes are directly connected to earth.

Each control grid is connected to a point X (Figures 2 and 3) above defined of the associated trigger circuits. This taking of voltage is determined in such manner that when one trigger is in the "0" condition, the corresponding control grid is at a potential which is strongly negative with respect to the cathode while, when this trigger is in the "1" condition the control grid is at a potential which is slightly negative with respect to the cathode. During practically the entire cycle of the machine, the pentodes VS and VP have an anode output which is practically zero, due to the fact that their screen grids are connected to earth through a high resistor 652. A conductor 653 connects the common point of the screen grids to a voltage source +100, passing through a contact CG1 controlled by a cam moved by the main shaft of the machine. The cam contact CG1 is closed for a short instant immediately upon completion of the analysis phase, thus applying a positive impulse to the said screen grids.

If, for example, the comparator assembly is at this moment in the condition $S>P$, that is to say, if BS is in the "1" condition and BP in the "0" condition when the screen grids of VS and VP receive the impulse of about 100 volts, only the tube VS may have an appreciable anode output since the grid of VP at this moment is strongly negative.

During this impulse, the electromagnet 650 is excited by the anode output of VS and closes its contact 650*a*, which controls the excitation of the electromagnet 654 which, because of its holding contact 654*a* and the cam contact CG2, remains excited until the commencement of a new machine cycle. When the condition $P>S$ is achieved, it is the valve VP which may discharge at the time of the impulse produced by CG1. In this case, a circuit similar to the above is formed; an electromagnet 655 is excited by the closing of contact 651*a* and is held by its contact 655*a* and CG2.

Finally, when the condition $S=P$ is obtained, it is obvious that neither of the two valves VS and VP discharges and that consequently neither of the electromagnets 654 and 655 is excited. The electromagnets 654 and 655 respectively control the change-over contacts 654*b* and 655*b*. When they are not supplied, the central blades of the said contacts occupy the position shown by Figure 2. This figure clearly shows that if neither of the electromagnets 654 and 655 is excited when CG3 closes, this closing will be translated by the excitation of an electromagnet 656, indicating the condition $S=P$. It will also be seen that if the electromagnet 654, being excited, has reversed the central blade of 654*b*, an electromagnet 657 will be excited by the closing of CG3, indicating the condition $S>P$. Finally, it is clear that if the electromagnet 655, being excited, has reversed the central blade of 655*b*, an electromagnet 658 will be excited by the closing of CG3 indicating the condition $P>S$. The excitation of one of the magnets 656, 657, 658 is maintained by CG3 until the end of the machine cycle and may be utilised for controlling various electrical elements such as the card feed electromagnetic clutches of S and P in the same manner as that described in the United States patent mentioned above.

Means are provided for the automatic return to zero of the triggers BS and BP (Figure 2). To this end, the positive impulse applied to the screen grids of the valves VS and VP is also transmitted to the inputs A of the said triggers. Two similar delay circuits 659 and 660 respectively have their output connected to the inputs of BS and BP by the conductors 661 and 662, while their inputs are joined and connected through the connecting condenser 663 to a common point of the screen grids of VS and VP. The delay circuits 659 and 660 are used not only in order that the impulses for the return to zero are received at the inputs of BS and BP after the electromagnets 650 and 651 have had the time to be fully excited, but also as voltage attenuators or dividers.

Finally, the effect of the positive impulse, when it is applied to the screen grids of VS and VP, is to produce the instantaneous excitation of one of the electromagnets 650 and 651 and when it is transmitted, retarded and attenuated, to the inputs A of the triggers BS and BP, to return to zero the one of the two triggers which at this moment is in the "1" condition. In order to prevent the positive impulse appearing at the output C of the trigger returned to zero from being transmitted, as during the analysis, to the input B of the other trigger, the contacts 650*b* and 651*b* have been respectively included in the conductors 648 and 649. For example, in the case where S is greater than P, the electromagnet 650 is excited during the positive impulse applied to the screen grids of the valves VS and VP so that its contact 650*b* is opened at the desired moment. It is however, necessary that the action of the electromagnets 650 and 651 be slightly prolonged in order that their contacts 650*b* and 651*b* are still open at the moment when an output impulse can appear at the outputs C of BS or BP.

In the case where the comparator arrangement is only required to provide the two conditions, viz: equal or different, it is simple to provide a different arrangement of the circuits for controlling the operative members of the machine according to these two conditions. A modification of the embodiment described is provided which is based on an analysis procedure different from that previously indicated.

The columns of the image of the recording card are now explored by commencing with the recording positions highest in numerical values and with the column of the highest decimal order. The analysis arrangements which have been described do not require any modification. It is sufficient for the cards to be brought to the analysis station in a position turned through 180° with respect to that of Figure 5.

The amplifying and discriminating circuits of non-simultaneous impulses remain identical, as does also their operation and that of the circuits used for the comparison.

It is now the first non-simultaneous impulse transmitted during the analysis of two recordings which must provide for the final condition of stability of the comparison stages.

It is necessary, when one of the triggers has received a first impulse and thus has passed to the "1" condition, that it be capable of preventing the transmission of any subsequent non-simultaneous impulse to the other trigger until the end of the analysis of the pair of recordings being compared.

Figure 6:
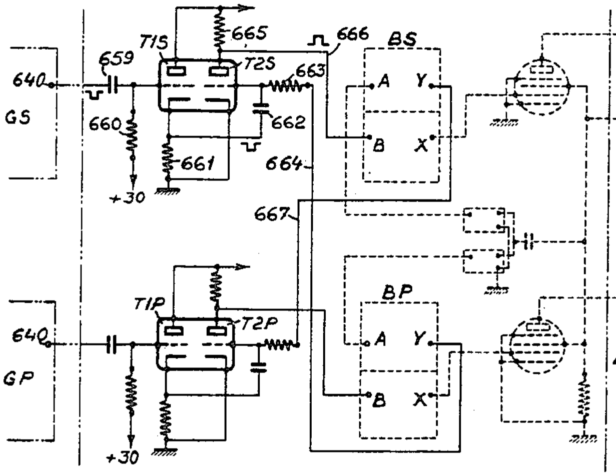
Figure 6 is a modification of the diagram according to Figure 2.

The circuits intended for achieving this result are shown in Figure 6, which indicates the modifications to be incorporated in the circuits of Figure 2 within the limits of the two vertical chain-dotted lines. In Figure 6, the parts in broken lines indicate the circuits of Figure 2 which have not been modified, while those in full lines indicate the added or modified circuits.

Added to each chain S or P is a circuit-breaking stage consisting of two triodes T1 and T2 shown in Figure 6 in the form of one double triode. Considering only the chain S, as the other is identical, a connecting condenser 659 is placed between the output 640 of GS and the grid of T1S, this grid being brought to a positive potential of about 30 volts with respect to earth through a resistor 660. The anode of this valve is connected directly to a high-tension source, while a load resistor 661 is inserted between the cathode and earth. This resistor is given a value such that the anode current has a mean value and produces a voltage slightly greater than the potential of the grid. The grid of T2S is coupled to the cathode of T1S by the connecting condenser 662 and its potential at rest is fixed through the leakage resistor 663 by the conductor 664 ending at a suitably chosen point Y of the circuits of the trigger BP. As the cathode of the valve T2S is connected directly to earth, it is necessary that the point Y gives a potential which is slightly negative in relation to earth when the trigger is in the rest position or the "0" condition, and a strongly negative potential when the said trigger is in the "1" condition.

A load resistor 665 supplies the current from a high-tension source to the anode of T2S which is connected by the conductor 666 to the input B of the trigger BS. Naturally, the rest potential of the grid of T2P is fixed by the point Y of the trigger BS because of the conductor 667. The operation of the arrangement will be readily understood by reference to a concrete example. Let it be assumed that the numbers 942 and 845 are respectively recorded on a card S and a card P.

Taking the new exploration method, it is obvious that the first impulse resulting from the analysis of the two cards will be a negative impulse corresponding to 9 available at the output 640 of GS (Figure 6). The effect of the application of this negative impulse to the grid of T1S is momentarily to reduce the anode current of this valve, which is translated by a negative impulse of slightly attenuated amplitude to the terminals of 661. This negative impulse, being transmitted to the grid of T2S, produces at the terminals of 665 a positive impulse which is of suitable polarity to cause the trigger BS to change to the condition "1," when it is initially in the condition "0," which is actually the case.

A negative impulse corresponding to 8 then appears at the output 640 of GP. As before, the result is a negative impulse to the terminals of the resistor 661 of T1P, but this impulse, transmitted to the grid of T2P, finds the latter already strongly negative because of the triggering of BS.

Consequently, no impulse is produced on the anode of T2P and the trigger BP can only remain at the condition "0." Then the simultaneous impulses corresponding to the 4's explored on the 10's columns are eliminated by the discriminator stages and no impulse appears at the terminals 640 of GS and GP.

Finally the impulse corresponding to the 5's appearing at 640 of GP is unable to affect the trigger BP, since BS is always in the "1" condition, while the impulse corresponding to the 2 of the units appearing at 640 of GS can no longer have any effect on BS because it would now be necessary, in order to make it trigger again, for a negative impulse to be produced on the anode of T2S, which is impossible.

Finally, the comparator group BS and BP clearly shows the secondary superiority disclosed in the 100's columns, and the operation would also be satisfactory for greater values within the limits of the capacity of the analysis arrangements which are provided. As before, the superiority of one of the values which are compared is translated by the movement to the "1" condition of the trigger of the corresponding chain, while equality is shown by the two triggers remaining at the "0" condition. The return to zero of the triggers is operated by the same members at the moment of using the comparison, carried out under the same conditions and with the same members as those previously described. Nevertheless, the connections 648 and 649 and the contacts **650*b* and 651*b*** are no longer useful and are to be omitted in this modification.

Although one particular embodiment of the invention and one modification thereof have been described, it is obvious that other modifications or omissions could be provided for without departing from the scope of the invention.

In particular, for the analysis of recordings, the replacement of the iconoscope tubes by tubes of the "Orthiconoscope" or "Image-Orthicon" type would present certain advantages.

I claim:

1. A device for comparing two numbers, respectively represented, on two tabulating cards, by a marking in one column for each digit, the columns being arranged in sequencies corresponding to the successive denominational orders, and these markings limiting in the columns portions whose lengths are related with the corresponding digits, this device comprising in combination, two means respectively adapted to scan the images of two columns of same denominational order with two cathodic beams and to control the displacements and focusing of said beams so that they are focused in one direction of displacement relative to the card and travel over the columns from the same initial moment, at such a rate that the portion scanned when passing on a marking is linearly related with the corresponding digit, the said means being also adapted to generate a controlling pulse at each passage of the beam spot on a marking, two channels respectively connected to the said means and adapted to finally take a first equilibrium state when they receive simultaneously the two signals corresponding to any denominational order, a second state when they receive in a given order the two signals corresponding to the highest denominational order, among those for which such a signal succession is observed and a third state when they received these two signals in the inverted order, these channels respectively comprising, from their inputs, two pulse discriminating elements, two trigger circuits, and connections connecting the element outputs with the circuit inputs, each circuit being adapted to take two equilibrium positions called zero and one positions in response to the pulses, these elements being so arranged as to be impermeable to two controlling pulses simultaneously received and permeable to any single pulse.

2. A device as claimed in claim 1, wherein the controlling pulses successively transmitted correspond to increasing denominational orders.

3. A device as claimed in claim 1, wherein the controlling pulses successively transmitted correspond to decreasing denominational orders and the channels are so arranged that the first controlling pulse triggers the corresponding trigger circuit into position one and blocks the passage to the other circuit of any pulse produced in the other means.

4. In a machine for comparing two by two the numbers registered in two series of tabulating cards, so that the numbers of each series, respectively registered in different cards, have each digit represented by one marking in one card column, the said machine comprising means to form successively and cyclically the images of the pairs of cards to be compared inside two television tubes, a device connected with the said means, so as to make its operation correspond to a given part of the machine operation cycle, this device comprising in combination two pulse producing means respectively connected with the tubes and adapted to make their cathodic beams scan the images of a pair of cards, column after column, to control the beam focusing by blanking pulses, and to linearly relate any registered digit with the part of the corresponding column limited by the beam starting point and the digit representing marking, these means being also adapted to produce a controlling pulse at every passage of a beam spot on a marking, two channels respectively connected to the pulse producing means and respectively comprising two pulse discriminating elements, two trigger circuits, whose equilibrium states are hereafter called zero and one positions, connections connecting the outputs of the elements with the corresponding circuit inputs, cross connections between said elements, the circuits being adapted to take at the end of each comparison, a first equilibrium state when they receive simultaneously the two signals corresponding to any denominational order, a second state when they receive in a given order the two signals corresponding to the highest denominational order, among those for which such a signal succession is observed and a third state when they receive these two signals in the inverted order the said channels respectively comprising also two reset means adapted to receive a reset pulse at the beginning of each comparison of two numbers and connections respectively connecting the reset means with inputs of the trigger circuits so that any reset pulse triggers into zero position any circuit in position one.

5. A device as claimed in claim 4, wherein the first equilibrium state corresponding to positions zero of the two circuits, whilst the second and the third ones correspond to simultaneous positions zero and one of these circuits.

6. A device as claimed in claim 4, wherein the controlling pulses successively produced correspond to increasing denominational orders.

7. A device as claimed in claim 4, wherein the controlling pulses successively transmitted correspond to decreasing denominational orders and the channels are so arranged that the first controlling pulse triggers the corresponding trigger circuit into position one and blocks the passage to the other circuit of any pulse produced in the other tube.

8. A device to compare two numbers respectively represented in corresponding columns on two documents by markings differentially located according to the values of the digits represented, this device comprising two cathode ray tubes each of the type including a mosaic plate, means for focusing and deflecting its cathode ray beam and an output terminal, means for projecting the image of each document on the mosaic plate of a corresponding one of said tubes, means for scanning the images through said beams by applying cyclic voltages or currents to the deflecting means to thereby generate a signal voltage or pulse at the output terminal of each tube at each passage of said beam on a marking image, a pulse comparing arrangement receiving the signal pulses through two separate transmitting channels from said output terminals and comprising indicating means to indicate, during the analysis of the marking images of two numbers, on which channel the last pulse has been transmitted, said channels comprising cross-connected discriminating elements adapted to suppress the transmission of the signal pulses occurring simultaneously.

9. The invention set forth in claim 8, in which the pulse comparing arrangement is adapted to indicate on which channel the first pulse has been transmitted.

References Cited in the file of this patent

UNITED STATES PATENTS

| | | |
|---|---|---|
| 1,985,035 | Kermode | Dec. 18, 1934 |
| 2,224,646 | Friedman | Dec. 10, 1940 |
| 2,247,684 | Hickok | July 1, 1941 |
| 2,251,828 | Hammond | Aug. 5, 1941 |
| 2,395,482 | Hurley | Feb. 26, 1946 |
| 2,580,270 | Badgley | Dec. 25, 1951 |
| 2,586,963 | Knutsen | Feb. 26, 1952 |